A. & L. A. HUBERT.
SWIVEL CARRIAGE FOR CABLE TRACTORS.
APPLICATION FILED MAY 22, 1917.

1,235,032.

Patented July 31, 1917.
3 SHEETS—SHEET 1.

Inventor
Andrew Hubert
Louis A. Hubert
By Moulton & Lurance
Attorneys.

A. & L. A. HUBERT.
SWIVEL CARRIAGE FOR CABLE TRACTORS.
APPLICATION FILED MAY 22, 1917.

1,235,032.

Patented July 31, 1917.
3 SHEETS—SHEET 2.

Inventor
Andrew Hubert
Louis A. Hubert
By Moulton & Lurrance
Attorneys.

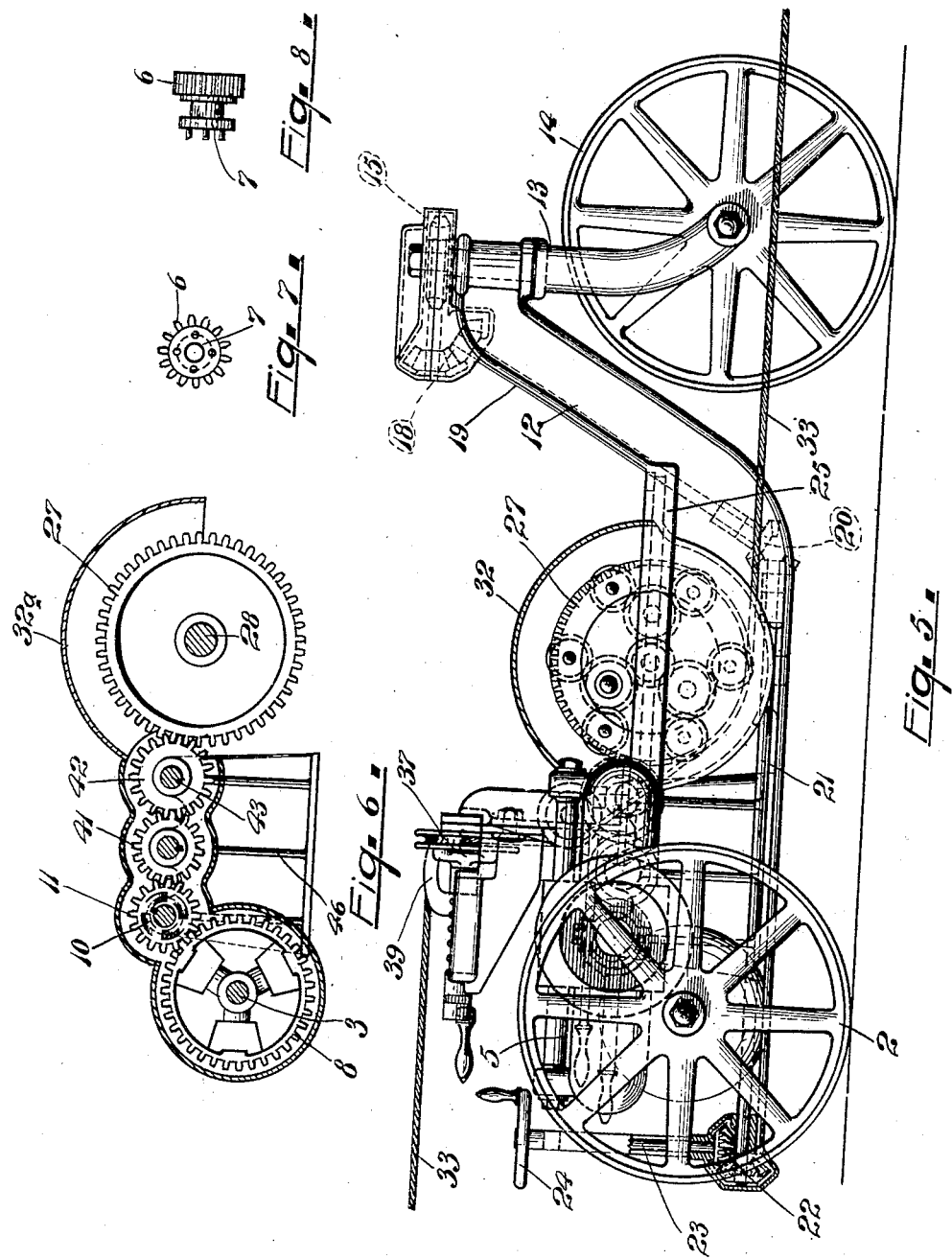

UNITED STATES PATENT OFFICE.

ANDREW HUBERT AND LOUIS A. HUBERT, OF SPARTA, MICHIGAN.

SWIVEL-CARRIAGE FOR CABLE-TRACTORS.

1,235,032.  Specification of Letters Patent.  Patented July 31, 1917.

Application filed May 22, 1917. Serial No. 170,228.

*To all whom it may concern:*

Be it known that we, ANDREW HUBERT and LOUIS A. HUBERT, citizens of the United States of America, residing at Sparta, in the county of Kent and State of Michigan, have invented certain new and useful Improvements in Swivel-Carriages for Cable-Tractors; and we do hereby declare the following to be a full, clear, and exact description of the invention, such as will enable others skilled in the art to which it appertains to make and use the same.

This invention relates to tractors and is directed to improvements shown in a pending application of Andrew Hubert, Ser. No. 82,220 filed March 4, 1916. It is an object and purpose of the present invention to provide a tractor which may be moved back and forth across a field by use of a cable attached to suitable anchors at each end of the field, said cable being wound around a driving drum on the tractor, the drum being so mounted that the tractor may be turned around at each end of the field while the drum remains relatively stationary, the frame and wheels of the tractor turning around the drum. Various other objects and purposes subsidiary to this main purpose, and many novel features of construction and arrangements of parts for attaining the same, are shown in the accompanying drawings which illustrate the invention in which;

Fig. 5 is a side elevation of the tractor.

Fig. 6 is a side elevation of the gearing connection by means of which the drum is driven, and Figs. 7 and 8 illustrate an end and side view, respectively, of a detail of construction.

Like reference characters refer to like parts throughout the several views of the drawings.

Figure 1:
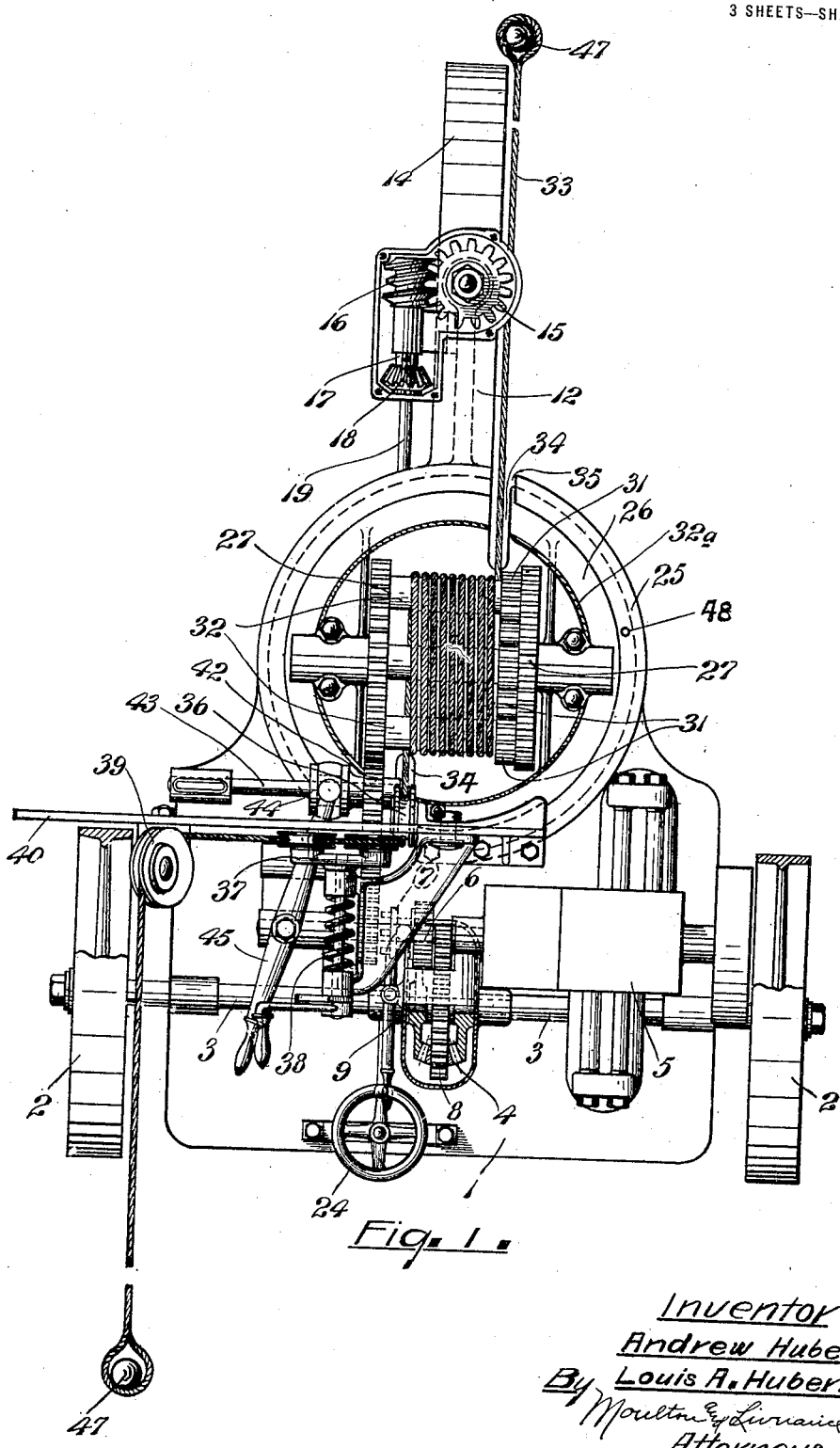
Figure 1 is a plan view of the tractor.
Figure 3:
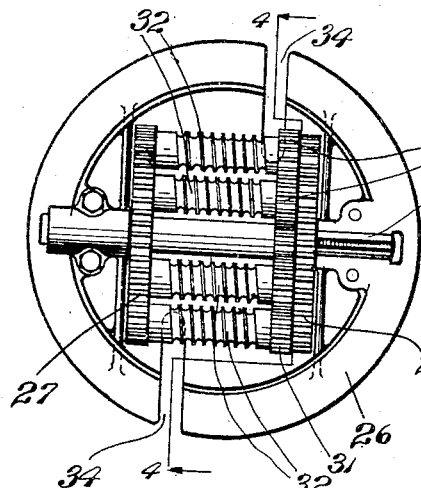
Fig. 3 is a plan view of the cable drum.
Figure 4:
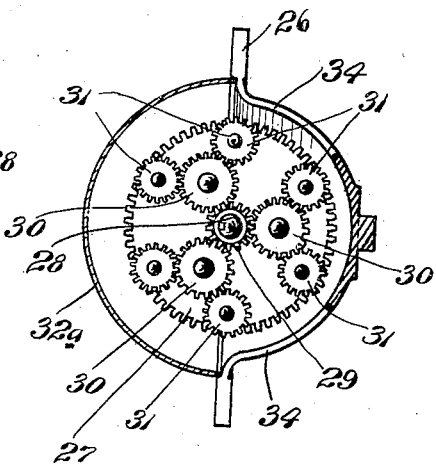
Fig. 4 is a section taken substantially on the line 4—4 of Fig. 3.
Figure 2:
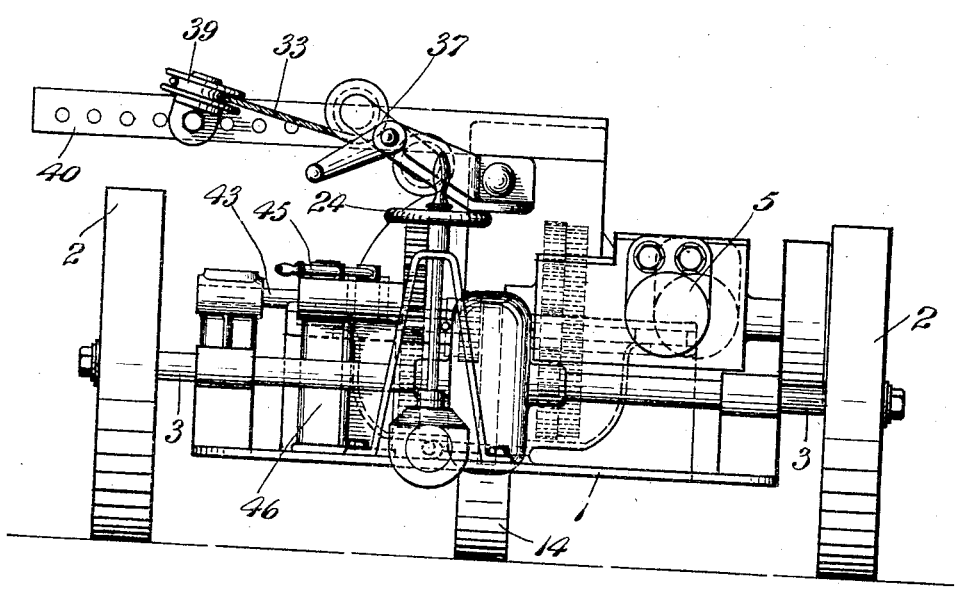
Fig. 2 is a rear elevation thereof.

The body or frame 1 of the tractor is carried adjacent its rear end by wheels 2 fixed to rear axles 3 which come together and are connected with a suitable differential gearing 4. The tractor is driven by a motor as indicated at 5 on the shaft of which a combined gear 6 and clutch member 7 is splined, the gear in one position engaging with gear 8 formed in one element of the differential. A lever 9 is pivotally mounted on the side of the differential case and connected with said combined gear and clutch member whereby the gear may be moved into or out of engagement with the gear 8, or the clutch member 7 may be moved to engage with a co-pending clutch face 10 formed in the side of a pinion gear 11 which, in practice, is adapted to drive the cable drum as hereafter described.

Frame 1 on its forward end is provided with an upwardly and forwardly extending beam 12 at the front end of which a fork 13 is pivotally mounted carrying a front wheel 14. Above the beam 12 the fork is provided with a worm wheel 15 meshing with a worm 16 on a short horizontal shaft 17 which has gearing connections 18 with a shaft 19 disposed substantially parallel to the beam 12. Shaft 19 on its lower end has gearing connections with a horizontal shaft 21 which extends substantially to the rear of the machine and has gearing connections 22 with a vertical shaft 23 provided with an operating wheel 24 at its upper end as shown. The construction outlined is one of many constructions which may be used to change the direction of the machine and steer the same as it is moved back and forward across the field or when it is turned around at the end of the field.

Mounted on the frame and preferably formed integral therewith is a circular support 25 grooved on its inner side to receive therein a second substantially circular support 26 on which a cable drum is mounted. The drum comprises spaced apart gears 27 loosely mounted upon a shaft 28 fixed to support 26 and at one end carrying a pinion 29 meshing with three idle pinions 30 mounted on the face of one of the gears 27, each of said pinions in turn driving two pinions 31 which are fixed on rollers 32 loosely mounted on and extending between the ends 27 of the drum. The drum is practically identical in construction with that shown in the previous application to which reference above is made and, in practice, we intend to cover the same with a housing such as indicated at 32ᵃ.

The cable 33 winds around the various rollers 32 which are grooved to receive the same. The stationary support 25 on the frame is slotted at front and rear at 34 to pass the cable to the front and back of the tractor. Similarly the movable circular support 26 is slotted at the front as indicated at 35 to pass the forwardly extending portion of the cable. The cable passes to the rear from the drum upwardly and around a guide pulley 36 and thence over two pulleys in a tension device 37 similar in all respects to the tension device shown in such previous application for patent and including a coil spring 38 which supplies the force for the tension, the cable thence passing over a pulley 39 which is attached to a bar 40 extending laterally from the suitable support which also carries the tension device, and is attached to the worm frame 1.

The gear 11 heretofore described, meshes with an idle pinion 41 which in turn meshes with a similar pinion 42 slidably mounted on a shaft 43, said pinion 42 being adapted to engage with either of the gears 27 of the drum. When the clutch member 7 is engaged with the gear 10 it is apparent that the drum will be driven by the engine 54. A collar 44 is formed integral with pinion 42 engaging with which is a lever 45 adapted to move gear 42 in and out of engagement with gear 27.

In practice the forward end of the cable 33 may be secured to any suitable anchor such as indicated at 47 at the front end of the field and as the drum is rotated the cable passes therefrom to the rear and the tractor forward as will be understood. The cable back of the machine is also connected to an anchor 47 and is kept in uniform tension by part 37. When the end of the field is reached the forward end of the cable 33 is raised above the circular portion 25 of the frame and the machine is turned around the part 26 and attached drum. Previously to turning the machine around, the rearwardly extending portion of the cable is taken off the pulley 9 and is disconnected from the tension device 37 and it is also necessary to operate the lever 45 and move the gear 42 out of engagement with the gear 27 of the drum. After the tractor has been turned around the drum, what was the forwardly extending portion of the cable will then be back of the tractor and the previous rearwardly extending part of the cable will be in front of the tractor while the opposite gear 27 of the cable drum will come into position to be engaged by the gear 42 when it is returned to its operative position. The rearwardly extending portion of the cable may thereupon be placed over the tension device and the pulley 39 and connected with the proper anchor back of the machine and the return trip of the tractor made. In practice it is advisable to have some removable connecting device such, for instance, as a removable pin indicated at 49, extending downwardly through the members 25 and 26 to lock them together while the movement across the field is taking place, such pin being removed when the machine is turned around.

We claim:—

1. In combination with a wheel supported apparatus, of means comprising a cable gripping drum mounted thereon for moving the apparatus so that said apparatus may be turned around at the end of its path of travel, the drum remaining relatively at rest and not turning with the apparatus during such turning movement.

2. A mechanism as claimed in claim 1, combined with means for alternately driving the drum and said apparatus.

3. A mechanism as claimed in claim 1 combined with means for driving the drum at either end thereof, said driving means changing position with respect to the drum as the apparatus is turned around it.

4. In combination with a wheel supported apparatus, of a propelling mechanism comprising a plurality of rollers, a cable wound around the rollers, and extending in front and back of the apparatus and removably connected to anchors, supporting means for the rollers mounted on the apparatus and adapted to turn about a vertical axis whereby said apparatus may be turned about said rollers, and means on the apparatus for driving said rollers at two different positions of the apparatus with respect to said rollers.

5. In a machine of the character described, a frame, wheel supports therefor, a horizontal annular ring portion forming a part of the frame, a horizontal circular ring member mounted on said ring portion of the frame whereby one may turn about a vertical axis with respect to the other, a cable drum mounted on said ring member, a cable wound around the drum and extending in front of and back of the drum, an anchor to which the ends of the cable are secured, and means to drive the drum in two opposed positions thereof on the frame.

6. A machine as claimed in claim 5 combined with means for detachably fixing said circular member in either of said two positions with respect to the circular frame portion during the time that the drum is driven.

7. A machine as claimed in claim 1 combined with a driving means for the drum, and means for connecting said driving means to apparatus to move the same as it is turning about the drum, and means for guiding said apparatus.

8. A machine as claimed in claim 1 in which said wheel supported apparatus includes a frame, spaced apart rear wheel therefor, a single front wheel, means for changing direction of the front wheel, and means for alternately driving the drum and said rear wheels, substantially as described.

9. In combination with a wheel supported apparatus, of means comprising a horizontally located cable gripping drum mounted thereon for moving the apparatus between two fixed anchors, means for driving the drum, means for mounting the drum loosely on the apparatus which said apparatus may be turned around the drum at the end of its path of travel, means for holding the drum fixed with respect to the apparatus while it is moving between said anchors, and means for connecting the drum driving means with the apparatus and disconnecting it from the drum while said apparatus is turned around, substantially as described.

In testimony whereof we affix our signatures.

ANDREW HUBERT.
LOUIS A. HUBERT.

Copies of this patent may be obtained for five cents each, by addressing the "Commissioner of Patents, Washington, D. C."